Sept. 6, 1938.  E. WILDHABER  2,129,077
GEAR CUTTER
Filed May 20, 1935  4 Sheets-Sheet 1

Inventor
Ernest Wildhaber
By
Attorney

Sept. 6, 1938.   E. WILDHABER   2,129,077
GEAR CUTTER
Filed May 20, 1935   4 Sheets-Sheet 2

Inventor
Ernest Wildhaber
By
B. W. Shlesinger
Attorney

Sept. 6, 1938.  E. WILDHABER  2,129,077
GEAR CUTTER
Filed May 20, 1935  4 Sheets-Sheet 3

Inventor
Ernest Wildhaber
By
Attorney

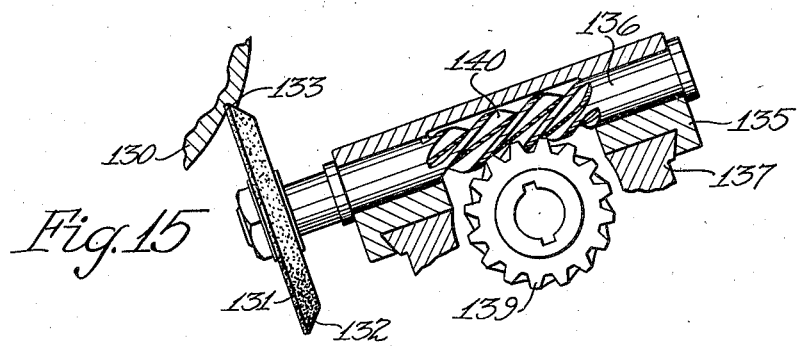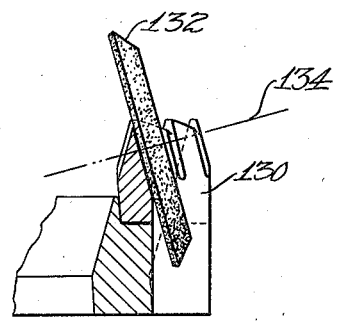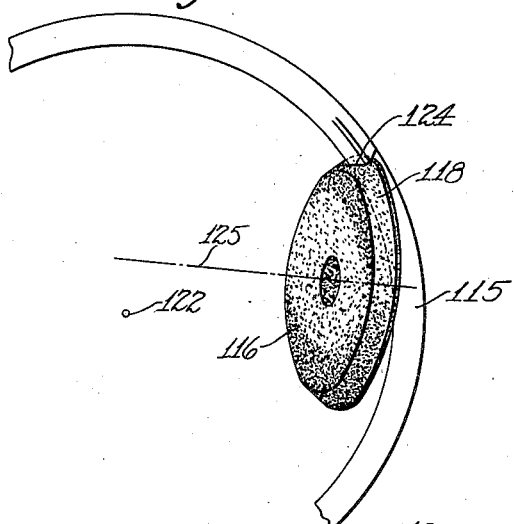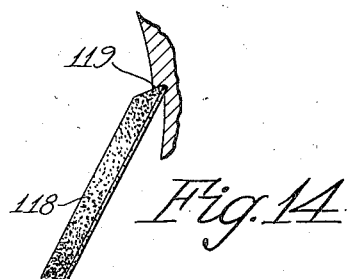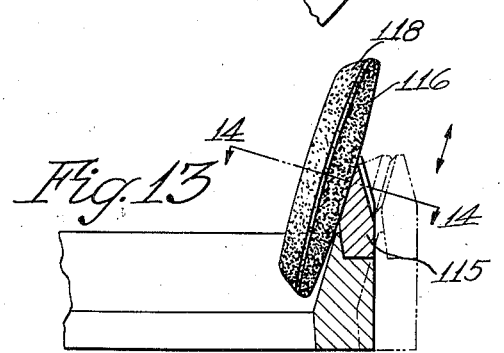

Patented Sept. 6, 1938

2,129,077

UNITED STATES PATENT OFFICE 2,129,077

GEAR CUTTER

Ernest Wildhaber, Irondequoit, N. Y., assignor to Gleason Works, Rochester, N. Y., a corporation of New York Application May 20, 1935, Serial No. 22,304

8 Claims. (Cl. 29—103)

The present invention relates to face-mill gear cutters and to the grinding of cutting clearance on the side faces and to the sharpening of the front faces of the cutting teeth or blades of such cutters.

Among other things, the invention has for its objects to provide a stiffer form of face-mill gear cutter, one in which a greater number of side cutting edges can be provided, one in which the side cutting edges can, where desired, be made accurately concentric of one another, and one which can be assembled quickly or quickly removed from a cutting machine, and one which is simple and cheap. These objects are attained by making the cutter with integral cutting blades and, if desired, in the form of a closed ring with its sides and tip gashed or recessed to form the cutting edges and with the side surfaces of the cutting blades ground back of said cutting edges to provide cutting clearance.

A further object of the invention is to provide an improved method and machine for grinding clearance on the sides of face-mill gear cutter blades or cutting teeth. This method is applicable equally to the grinding of blades for inserted-blade type face-mill cutters as well as to the grinding of the sides of the cutting teeth of integral-blade type face-mill gear cutters.

Still another object of the invention is to provide an improved method of sharpening face-mill gear cutter blades and particularly the cutting teeth of face-mill gear cutters of the integral-blade type.

Other objects of the invention will be apparent hereinafter from the specification and from the recital of the appended claims.

In the drawings:

Fig. 12 is a fragmentary plan view and Fig. 13 is a fragmentary sectional view showing one method of sharpening the inside cutting edges of a cutter such as shown in Fig. 8, Fig. 13 being a section taken in the plane of griding, that is, in this case a plane offset from the axis of the cutter;

Fig. 14 is a fragmentary view further showing the relationship between the grinding-wheel and a tooth during sharpening, the section through the cutter being taken on the line 14—14 of Fig. 13;

Figure 8:
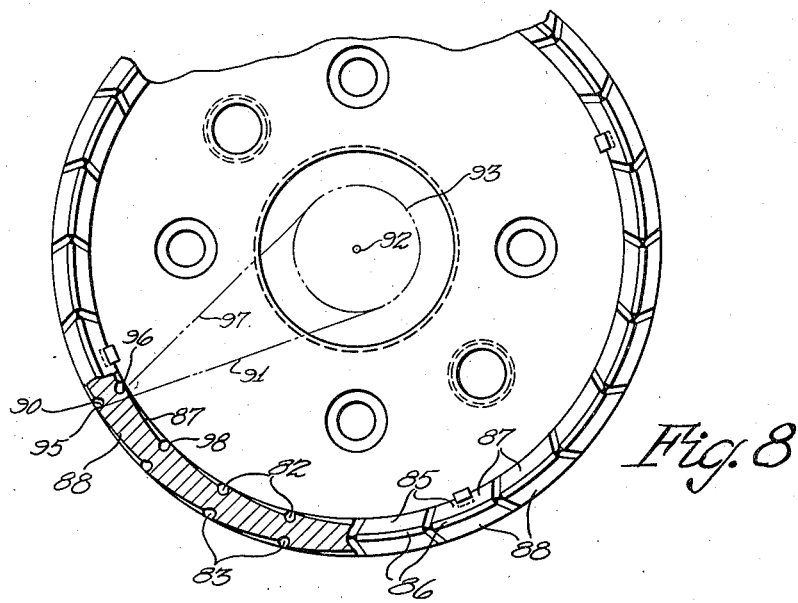
Fig. 8 is a fragmentary plan view, partly in section.

Fig. 15 is a fragmentary plan sectional view showing a slightly modified method of sharpening the blades of a cutter such as shown in Fig. 8 and particularly the outside surfaces thereof, parts of the drive and support for the grinding-wheel being also shown in section; and Fig. 16 is a fragmentary sectional view taken at right angles to that of Fig. 15 and further showing the relation of the grinding-wheel and cutter in this arrangement for the sharpening of the outside cutting edges.

Figure 1:
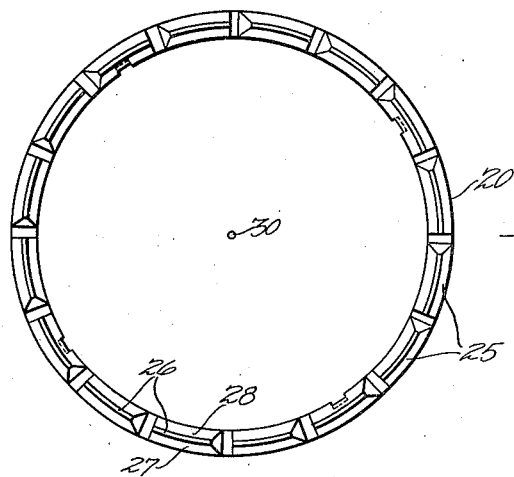
Fig. 1 is a plan view of a ring-type face-mill gear cutter constructed according to one embodiment of the present invention.
Figure 2:
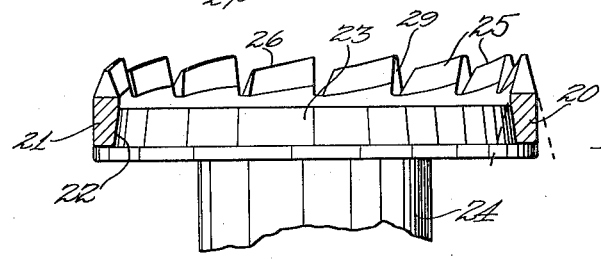
Fig. 2 is a sectional view of this cutter mounted on the cutter spindle of a gear cutting machine.

Referring first to Figs. 1 and 2, 20 designates a face-mill gear cutter constructed according to one embodiment of this invention. This cutter is in the form of a continuous, closed ring. The ring may be made in any suitable manner. Thus, it may be made by bending rectangular bar-stock into a circle and welding the free ends of the bent bar together to close the circle. The body-portion 21 of the ring will be shaped to fit the support or spindle upon which the cutter is to be mounted. Thus, as shown in Fig. 2, the body-portion 21 of the ring is formed internally with a conical surface 22 to fit the tapered conical nose 23 of the cutter spindle 24 of the gear cutting machine upon which the cutter is to be used.

Previous to bending, the portion of the ring in which the cutting teeth are to be formed, may be rolled to a proper profile, that is, with sides converging and, if so desired, may also be gashed or recessed to form the cutting teeth 25. In the preferred construction, the ring is so shaped that the body portion 21 of the ring lies wholly within the wedge-shaped space defined by the extensions (shown in dotted lines in Fig. 2) of the profiles of the cutting portion of the ring. This construction permits of sharpening the teeth of the cutter by the sharpening method hereinafter to be described.

The tops 26 and sides 27 and 28 of the cutting teeth are relieved or otherwise provided with cutting clearance back of the cutting edges. The front faces 29 of the cutting teeth may be sharpened with a side rake and alternate cutting teeth may be sharpened with opposite side rakes so that alternate cutting edges will be on opposite sides of the cutter according to known construction or, as shown, the front faces of the cutting teeth may be sharpened to lie in planes that are radial of the axis 30 of the cutter so that each cutting tooth is provided with two cutting edges at its opposite sides. Other ways of sharpening the cutter will be obvious from the prior art.

When the cutting teeth are as long from front to rear as are the cutting blades of the ordinary inserted blade type of face-mill gear cutter, the side and top surfaces of the cutting teeth 25 may be relief-ground on the machine and by the process, for instance, of the Gleason Patent No. 1,285,124 of November 19, 1918. One of the advantages of the integral-blade type of cutter over the inserted blade type of cutter, however, is that a greater number of cutting edges can be provided in a cutter of given diameter without sacrifice of strength or stiffness. The greater the number of cutting edges provided, however, the shorter the length of the cutting teeth from front to rear. Hence the mentioned relieving process is not always satisfactory. Cutting clearance may be ground on the sides of cutting teeth, however, regardless of their length by the grinding method of the present invention.

In this process, a grinding-wheel is used which has an operating profile of circular arc form to correspond to the curvature of the side surface of the cutting blade from front to rear and this grinding-wheel is moved relative to the cutter along an element of the side surface of the blade.

Figure 3:
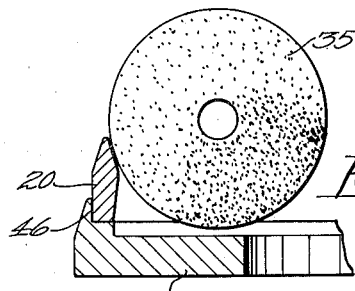
Fig. 3 is a fragmentary sectional view and Fig. 4 a fragmentary plan view showing the method of grinding the side-clearance on the inside surfaces of the blades or teeth of a face-mill gear cutter such as shown in Figs. 1 and 2.
Figure 4:
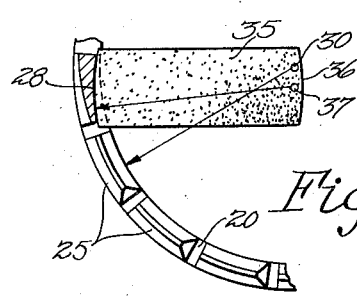

Figs. 3 and 4 illustrate the grinding of the cutting clearance on the inside surfaces 28 of the teeth 25 of the cutter 20. Here a grinding-wheel 35 is employed that has a convex operating surface 36 of circular arc profile shape to fit the inside surfaces 28 to be ground on the cutting blades. The grinding-wheel is so dressed or positioned relative to the cutter that when it is in operation, the center 37 of its operating profile will be offset from the center 30 of the cutter. This offset provides the cutting clearance of the side surface back of the cutting edge of a tooth. The grinding-wheel 35 is moved, preferably reciprocated, along an element of the side surface 28 of the cutting tooth being ground. The cutting teeth 25 shown are of straight profile and the grinding-wheel 35 is therefore reciprocated along a straight line element of the side surface 28 of each cutting blade in order to grind the cutting clearance on the blades. When one blade has been ground, the grinding-wheel 35 is withdrawn from engagement with the cutter and the cutter is indexed to bring the next cutting tooth into position to be ground.

Figure 5:
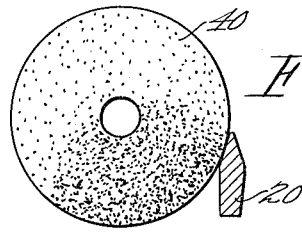
Figs. 5 and 6 are corresponding fragmentary sectional and plan views, respectively, showing the method of grinding the cutting clearance on the outside surfaces of the teeth or blades of such a cutter.
Figure 6:
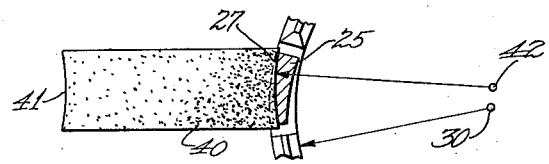

The grinding of the outside surfaces of the cutting teeth is illustrated in Figs. 5 and 6. Here a grinding-wheel 40 is employed that has a concave operating surface 41 whose profile is of circular arc shape to correspond to the curvature from front to rear of the outside surfaces 27 of the cutting teeth 25. In the grinding, the grinding-wheel is so dressed or positioned that when it is grinding a cutting tooth of the cutter, the center 42 of its operating profile will be offset from the axis 30 of the cutter. This offset provides the cutting clearance. In grinding the side 27 of each tooth, the grinding-wheel is rotated on its axis and simultaneously moved relative to the cutter along an element of the side surface 27 of the cutting tooth. For cutting teeth of straight profile, such as shown, the grinding-wheel is reciprocated along a straight line element of the side surface of each tooth. After a cutting surface has been ground, the grinding-wheel 40 is moved clear of the cutter and the cutter indexed to bring another tooth into grinding position.

With the described process of grinding, the ground side surfaces of the cutting teeth are cylindrical surfaces whose axes are offset from the axis of the cutter and inclined to the axis of the cutter, passing through points such as the points 37 and 42, respectively. When the radii of the cylindrical surfaces are properly selected the cylindrical surfaces will approximate very closely helical surfaces ground by the process of the Gleason patent above mentioned or conical surfaces ground by the known offset method of grinding.

In grinding the inside surfaces of the cutting teeth, it is preferable to use a special head such as shown at 45 in Fig. 3 in order to hold the cutter. The cutter ring is chucked in this head by its outside surface 46 which may be ground slightly conical to fit an internal conical surface formed on the head 45. The head 45 holds the cutter securely and permits free movement of the grinding-wheel 35 to grind the sides of the cutting teeth from top to bottom thereof. This same head may be used, if desired, in grinding the outside surfaces of the teeth.

With the present invention, all of the cutting teeth are ground in place and therefore in the case of a ring-type cutter are accurately concentric. Moreover, the continuous ring provides a very stiff cutter. These is also nothing to get loose and the cutter is very easy to produce.

Figure 7:
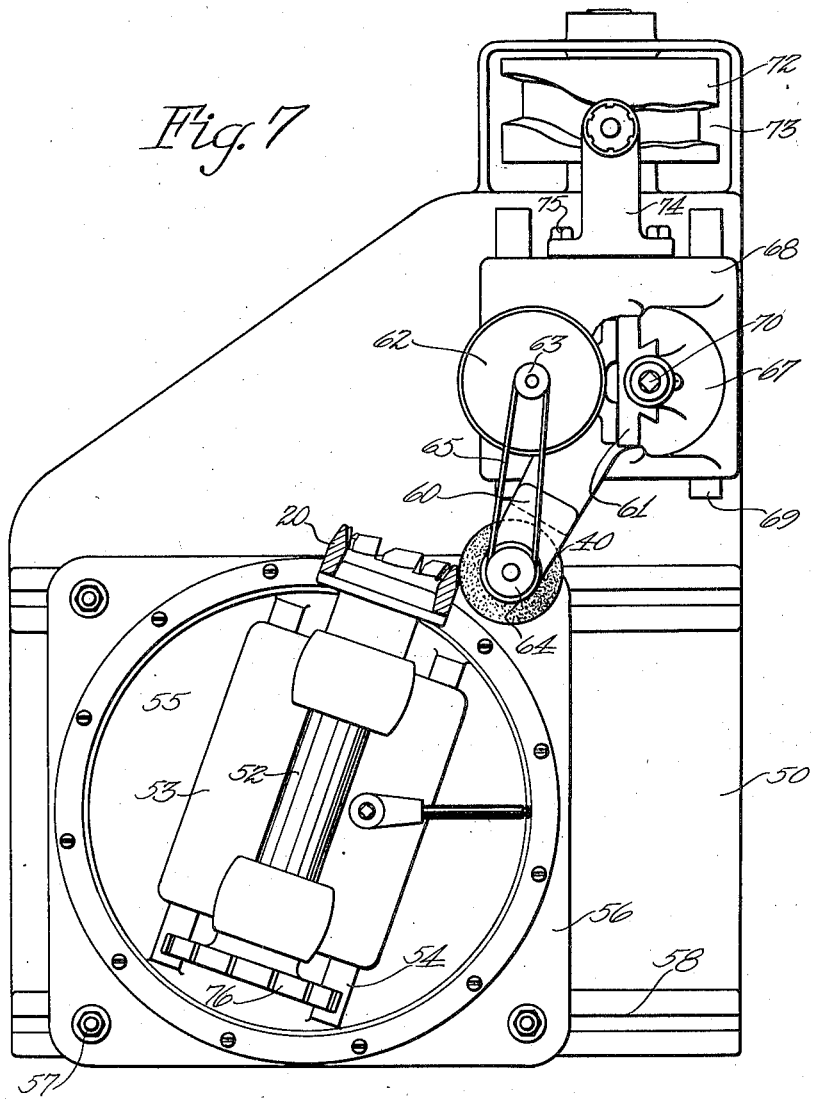
Fig. 7 is a plan view of a machine built according to one embodiment of this invention for grinding the cutting clearance on the sides of blades of a face-mill gear cutter.

One form of machine for grinding the cutting clearance on the sides of the cutting teeth is shown in Fig. 7. 50 designates the base or frame of this machine. The cutter 20 to be ground is secured in any suitable manner to the work spindle 52 of this machine. The work spindle is journaled in suitable bearings in the work head 53 which is adjustable axially of the spindle on ways 54 that are formed on the upper surface of a rotary turret or table 55. The turret or table 55 is mounted for rotatable adjustment upon a slide 56 that is laterally adjustable upon the base 50. The bolts 57 which engage in the T-slots 58 formed in the base 50 serves to secure the slide 56 in any position of its lateral adjustment. The grinding-wheel is journaled in the projecting arm 60 of the slide 61 on which is mounted the motor 62 that drives the grinding-wheel. The motor is connected to this grinding-wheel by the pulleys 63 and 64 and the belt 65. The slide 61 is vertically adjustable upon the column 67 of a carriage 68 that is slidable on ways 69 formed on the base of the machine.

The slide 61 can be adjusted vertically on the column 67 by rotation of the screw-shaft 70.

The carriage 68 is reciprocated by a cam 72 which is secured to a shaft that is rotatably mounted in the base of the machine. The track 73 of this cam engages a roller which is carried by a bracket 74 that is secured by bolts 75 to the carriage 68.

The cam 72 imparts a reciprocating movement to the grinding-wheel which moves the wheel along an element of the side surface of the cutting tooth during the grinding thereof and in addition periodically withdraws the grinding-wheel from operating position to permit indexing of the cutter. To this end, the track 73 of the cam is formed with a series of short alternate rises and depressions which impart the short reciprocating movements to the grinding-wheel and with a single long rise, a dwell and a return to withdraw the grinding-wheel from operating position, retain it out of operating position during indexing and return it to operating position after the indexing has been completed. The index mechanism for the work spindle may be of any suitable type. Preferably, a notched-plate type of index mechanism will be employed. The plate of such a mechanism is shown at 76.

When grinding the outside surfaces of the cutting teeth, a concave grinding-wheel such as shown at 40 will be employed while when grinding the inside surfaces of the cutting teeth, a convex type of grinding-wheel such as shown at 35 will be used. The angular adjustment of the table 55 permits of setting the cutter to the pressure angle of the side surfaces to be ground on the cutting teeth. The lateral adjustment of the slide 56 allows of moving the cutter head to one side or the other of the grinding-wheel depending upon whether the outside or the inside surfaces of the cutting teeth are being ground. The vertical adjustment of the slide 61 upon the column 67 permits of offsetting the center of the operating profile of the grinding-wheel relative to the axis of the cutter so as to grind the side surfaces of the cutting teeth with the desired cutting clearance. In operation, the work is held stationary and the grinding-wheel is rotated continuously on its axis from the motor 62 while being simultaneously reciprocated up and down the surface of a cutting tooth by the cam 72. After a series of short strokes, the wheel is withdrawn by action of the cam 72, the work spindle is released and the cutter is indexed to bring the next tooth of the cutter into position to be ground.

Figure 9:
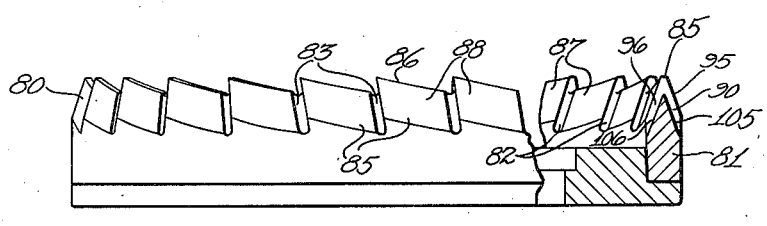
Fig. 9 is a side elevation, partly in section, of a face-mill gear cutter constructed according to a different embodiment of the present invention.

Figs. 8 and 9 show another embodiment of a cutter made according to this invention. Here, the cutting portion is again in the form of a continuous ring 81 but the projecting V-shaped portion 80 of the ring has converging grooves or indentations 82 and 83 formed at spaced intervals in its sides and these grooves or indentations 82 and 83 do not extend entirely through the operating portion of the cutter. They converge and join only at the tip of the cutter. This general type of cutter is especially valuable where it is desirable to provide a great number of cutting edges since the cutting teeth are connected together and one cutting tooth backs up another and the cutter can better take the cutting thrusts.

In the illustrated embodiment, the grooves 82 and 83 are opposite one another, but if desired they might be staggered with reference to one another around the circumference of the cutter.

The grooves 82 and 83 serve to define the cutting teeth 85 of the cutter.

The tops 86 and sides 87 and 88 of the cutting teeth are ground to provide cutting clearance back of the tip and side cutting edges of the cutting teeth.

A further advantage of the form of cutter shown in Figs. 8 and 9 is that it is comparatively easy to sharpen the cutting edges of opposite sides of the teeth of such a cutter with proper side rake so that each edge will cut cleanly. Thus, as shown in Fig. 8, the walls 90 of the grooves 83 may be sharpened to lie in the planes 91 offset from the axis 92 of the cutter and tangent to a circle 93 circumscribed about the axis of the cutter so that these walls 90 will be inclined to the adjacent side surfaces 88 of the cutting teeth at acute angles to provide sharp outside cutting edges 95. Likewise, the walls 96 of the grooves 82 may be sharpened to lie in planes 97 also offset from the axis 92 of the cutter but to the opposite side thereof and tangent to the circle 93 so that the walls 96 are inclined to the inside surfaces 87 of the cutting teeth at acute angles to provide sharp inside cutting edges 98.

Since the grooves 82 and 83 do not pass wholly through the V-shaped projecting portion of the cutter, the cutting teeth 85 are integral with one another and each cutting tooth is supported by the strength of a solid ring.

Figure 10:
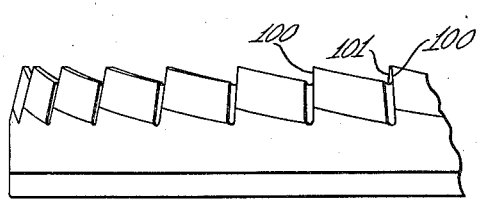
Fig. 10 is a fragmentary side elevation of a face-mill gear cutter constructed according to still another embodiment of this invention.

In the embodiment of the invention shown in Fig. 9, the side-cutting edges are provided with a hook, that is, they are inclined rearwardly of the direction of rotation of the cutter from the tips of the cutting teeth inwardly. In the embodiment of the invention shown in Fig. 10, the opposite side cutting edges 100 and 101 extend parallel to the axis of the cutter, that is, they have neither hook nor drag.

Figure 11:
Fig. 11 is a section through the ring of a cutter constructed according to one embodiment of this invention and showing a way of sharpening the cutting edges which is slightly different from the form of sharpening shown in Fig. 9.

The cutting teeth may be sharpened along their cutting edges or at angle thereto as may be desired. In Fig. 9 the cutting teeth are shown sharpened along their cutting edges, that is, the grinding-wheel is moved parallel to the cutting edge in sharpening either side of a tooth. Thus, the bottoms 105 and 106, respectively, of the grooves 83 and 82 will be parallel to the side cutting edges 95 and 98, respectively, of the cutting teeth. In Fig. 11 a cutting tooth 110 is shown which is sharpened at an angle to the cutting edges, that is, in the sharpening operation the grinding-wheels for sharpening the opposite side cutting edges 111 and 112 of the tooth are moved at angles to the cutting edges. Thus the bottoms 113 and 114, respectively, of the grooves defining the cutting teeth are inclined to the cutting edges.

One method of sharpening a cutter of the type shown in Figs. 8 to 11 inclusive forms part of the present invention and is illustrated in Figs. 12 to 14 inclusive. Here the cutter to be sharpened is designated at 115. I have illustrated the sharpening of the inside cutting edges of this cutter with a grinding-wheel 116 which has a conical operating surface 118. The grinding-wheel is positioned for sharpening so that it has contact with the front face of the tooth to be sharpened. In the sharpening operation, the grinding-wheel is rotated on its axis and simultaneously reciprocated along the front face of the tooth from top to bottom thereof in a direction perpendicular to the axis of the grinding-wheel. When one tooth has been sharpened, the wheel is disengaged relatively from the cutter and the cutter indexed to bring another tooth into position to be sharpened. In Figs. 12 to 14 inclusive, the grinding-wheel is shown slightly tilted so that its axis is inclined to a plane extending in the direction of motion of the grinding-wheel and parallel to the axis 122 of the cutter. This is one way of positioning the wheel. Another possible position is shown in Figs. 15 and 16. The reciprocating movement may be exactly along the cutting edge, as indicated in Fig. 9, or it may be at a slight angle thereto, as illustrated in Fig. 11.

Fig. 13 is a section through the cutter taken in the plane of sharpening. The dotted lines are intended to indicate the positions of other cutting teeth of the cutter in a section taken in a plane passing through the axis 122 of the cutter.

The outside cutting edges of the cutter may be sharpened by readjusting the grinding-wheel relative to the cutter and, as described for the sharpening of the inside cutting edges, passing the wheel along the front face of a tooth while rotating the wheel on its axis.

The sharpening of the outside edges of a cutter is illustrated in Figs. 15 and 16. To indicate the possibilities of the invention, the grinding-wheel is here shown positioned so that its axis is parallel to a plane extending in the direction of motion of the grinding-wheel and parallel to the axis of the cutter. The cutter to be sharpened is designated at 130 and the grinding-wheel is designated at 131. It has a conical operating surface 132.

The sharpening operation is effected as before by moving the grinding-wheel along the cutting edge to be sharpened in a direction perpendicular to its axis while rotating the wheel on its axis. When sufficient stock has been ground off of the front face of the blade, the wheel is withdrawn from engagement with the cutter and the cutter indexed to bring a new tooth into position to be sharpened.

In its reciprocating movement, the slide 135 on which the wheel spindle 136 is mounted may be guided by ways 137 formed on a suitable support. The wheel may be driven from a motor or any other suitable source of power through the gears 139 and 140, the gear 139 being carried by the slide 135.

Now, while the invention has been illustrated in connection with face-mill gear cutters whose cutting edges are annularly arranged it will be understood that the invention is applicable also, to other forms of face-mill gear cutters as, for instance, face-mill gear cutters of the single cycle or broaching type and face-mill gear cutters of the hobbing or scroll type. In general it may be said that while the invention has been described in connection with certain particular modifications, it is capable of various other embodiments and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A face-mill gear cutter comprising a continuous ring having an operating portion the sides of which converge and which have grooves formed therein at intervals to define cutting teeth with side cutting edges, said grooves being shallow enough to leave metal connecting the operating parts of successive teeth so that they are integral with and support one another against cutting thrusts, the sides of said teeth back of said grooves being cylindrical surfaces whose axes are offset from and inclined to the axis of the cutter.

2. A face-mill gear cutter having an operating portion whose sides converge and have grooves formed therein at spaced intervals to provide side cutting edges, said grooves being shallow enough as not to extend through the whole of said operating portion, the sides of said operating portion back of said cutting edges being cylindrical surfaces whose axes are offset from and inclined to the axis of the cutter.

3. A face-mill gear cutter comprising a continuous ring which has an operating portion, the sides of which converge and which has grooves formed in both sides at spaced intervals to define cutting teeth with oppositte side cutting edges, said grooves having bottoms parallel to said sides and being shallow enough to leave metal connecting the operating portion of successive teeth so that the teeth are integral with and support one another, the sides of said teeth being relieved back of said grooves to provide cutting clearance.

4. A face-mill gear cutter comprising a continuous ring which has an operating portion the sides of which converge and which has grooves formed in both sides at spaced intervals to define cutting teeth with opposite side cutting edges, said grooves having bottoms parallel to said sides and being shallow enough to leave metal connecting the operating portions successive teeth so that the teeth are integral with and support one another, the sides of said teeth being cylindrical surfaces whose axes are offset from the axis of the cutter and inclined to the axis of the cutter.

5. A face-mill gear cutter having a circular cutting portion provided with converging sides which are grooved at spaced points to define cutting teeth, the grooves extending only part-way through the cutting portion, the back wall of each groove being plane and constituting the front face of a tooth and being inclined at an acute angle to the adjacent side surface of the tooth to provide a side-cutting edge, each tooth being formed on its side surface with cutting clearance back of the side cutting edge, said teeth being convexly curved from front to rear on their outside surfaces and concavely curved on their inside surfaces.

6. A face-mill gear cutter comprising a continuous ring having a cutting portion provided with converging sides that are grooved at spaced intervals to provide a plurality of cutting teeth, the grooves in the sides of said cutting portion being of a depth less than the thickness of said cutting portion and the back wall of each groove constituting the front face of a tooth and lying in a plane offset from the axis of the cutter and being inclined at an acute angle to the adjacent side of the tooth to provide a side cutting edge on the tooth, and the sides of the teeth being ground back of said cutting edges to provide cutting clearance.

7. A cutting member for face-mill gear cutters comprising a body portion and a plurality of cutting teeth which are integral therewith, and which project beyond the body portion, said body portion having a side surface which is a surface of revolution and which is adapted to be seated against a coaxial matching surface of revolution formed on the cutter when the cutting member is secured to the cutter each of said cutting teeth having a cylindrical side surface whose axis is offset from and inclined to the common axis of said surfaces of revolution when the cutting member is secured to the cutter.

8. A face-mill gear cutter comprising a rotary head and a cutting member, said head having a peripheral surface which is a continuous surface of revolution and said cutting member having a body portion and a plurality of cutting teeth which are integral therewith, the body portion of said cutting member having an internal surface which is a surface of revolution matching the peripheral surface of the head, said cutting member being secured to the said head so that the internal surface of its body portion seats against the peripheral surface of the head and its cutting teeth project beyond one side face of the head in the general direction of the axis of the head, each of said cutting teeth having a cylindrical side surface whose axis is offset from and inclined to the axis of the head when the cutting member is secured to the head.

ERNEST WILDHABER.